United States Patent
Sugiyama et al.

(10) Patent No.: US 6,799,230 B2
(45) Date of Patent: Sep. 28, 2004

(54) PERIPHERAL DEVICE EXCHANGING DATA WITH ONE OF HIGHER-ORDER DEVICES BY SWITCHING INTERFACES

(75) Inventors: Sho Sugiyama, Hannou (JP); Shuichi Saito, Tachikawa (JP); Yasuhide Ishimori, Iruma (JP)

(73) Assignee: Teac Corporation, Tokyo (JP)

( * ) Notice: Subject to any disclaimer, the term of this patent is extended or adjusted under 35 U.S.C. 154(b) by 86 days.

(21) Appl. No.: 10/222,486

(22) Filed: Aug. 16, 2002

(65) Prior Publication Data

US 2003/0034880 A1 Feb. 20, 2003

(30) Foreign Application Priority Data

Aug. 20, 2001 (JP) ........................................ 2001-249095

(51) Int. Cl.⁷ ............................................. G06F 13/12
(52) U.S. Cl. ................... 710/62; 710/74; 710/2
(58) Field of Search ................. 710/62–65, 8, 710/2

(56) References Cited

U.S. PATENT DOCUMENTS

| | | | | | |
|---|---|---|---|---|---|
| 6,064,566 | A | * | 5/2000 | Agata et al. ................. | 361/684 |
| 6,256,700 | B1 | * | 7/2001 | Sauber ........................ | 710/316 |
| 6,442,734 | B1 | * | 8/2002 | Hanson et al. ................. | 716/4 |
| 2003/0095379 | A1 | * | 5/2003 | Fujiki et al. ................. | 361/686 |
| 2003/0233507 | A1 | * | 12/2003 | Yu et al. ...................... | 710/310 |

FOREIGN PATENT DOCUMENTS

| | | |
|---|---|---|
| JP | 10-27154 | 1/1998 |
| JP | 2001-22527 | 1/2001 |
| JP | 3077518 | 2/2001 |

* cited by examiner

*Primary Examiner*—Fritz Fleming
*Assistant Examiner*—Alan Chen
(74) *Attorney, Agent, or Firm*—Anderson Kill & Olick, P.C.; Eugene Lieberstein; Michael N. Meller

(57) ABSTRACT

A control unit of a peripheral device enables data to be exchanged between a unit of the peripheral device and one of a plurality of higher-order devices by using one of a plurality of interface units. Thus, the unit of the peripheral device is controlled by the higher-order device corresponding to the used interface unit.

15 Claims, 16 Drawing Sheets

PERIPHERAL DEVICE EXCHANGING DATA WITH ONE OF HIGHER-ORDER DEVICES BY SWITCHING INTERFACES

BACKGROUND OF THE INVENTION

1. Field of the Invention

The present invention generally relates to a peripheral device, and more particularly, to a peripheral device controlled by a predetermined higher-order device so as to operate.

2. Description of the Related Art

Personal computers include a desktop computer and a notebook computer. Here, a description will be given, with reference to the drawings, of the desktop computer and the notebook computer.

FIG. 1A and FIG. 1B illustrate conventional computers. FIG. 1A is a perspective view of a desktop computer 1. FIG. 1B is a perspective view of a notebook (personal) computer 52.

The desktop computer 1 includes a computer body 11, a keyboard 12, a mouse 13, and a display 14. The keyboard 12, the mouse 13 and the display 14 are connected to the computer body 11. The computer body 11 executes programs according to commands from the keyboard 12 and the mouse 13. The display 14 displays a screen, such as a screen showing a result of an operation performed in the computer body 11.

FIG. 2 is a block diagram of the computer body 11.

The computer body 11 includes a CPU (central processing unit) unit 21, a CPU slot 22, a system controller 23, a memory 24, a graphics controller 25, an image output connector 26, a PCI (peripheral component interconnect) bus 27, PCI slots 28, a bridge circuit 29, a floppy disk drive (FDD) connector 30, a floppy disk drive (FDD) 31, an IDE (integrated device electronics) connector 32, a hard disk drive (HDD) 33, an IDE connector 34, a CD-R/RW (compact disk-recordable/rewritable) drive 35, ISA (industry standard architecture bus) slots 36, a ROM (read only memory) 37, USB (universal serial bus) connectors 38 and 39, a power supply unit 40, and a power supply switch 41.

The CPU slot 22 is a slot for mounting the CPU unit 21; thus, the CPU unit 21 is mounted on the CPU slot 22. The CPU unit 21 mounted on the CPU slot 22 is connected to the system controller 23. The CPU unit 21 incorporates a CPU, a secondary cache and so forth, and executes processes based on programs and data supplied from the system controller 23.

Besides the CPU slot 22, the memory 24, the graphics controller 25 and the PCI bus 27 are connected to the system controller 23. The memory 24 is composed of a RAM so as to temporarily store programs and data, and is used as a working storage.

The graphics controller 25 converts data supplied from the system controller 23 into image data of an RGB format, for example, and outputs the image data via the image output connector 26. The image output connector 26 is connected to the display 14. The display 14 displays a screen according to the image data from the image output connector 26.

The PCI slots 28 and the bridge circuit 29 are connected to the PCI bus 27. The PCI bus 27 is a high-speed bus for exchanging data among the system controller 23, the PCI slots 28 and the bridge circuit 29. Various PCI devices, such as a modem, an audio processing board, an image processing board, can be mounted on the PCI slots 28.

Besides the PCI bus 27, the floppy disk drive connector 30, the IDE connectors 32 and 34, the ISA slots 36, the ROM 37, and the USB connectors 38 and 39 are connected to the bridge circuit 29. The bridge circuit 29 functions as a bridge for exchanging data among the PCI bus 27, the floppy disk drive connector 30, the IDE connectors 32 and 34, the ISA slots 36, the ROM 37, and the USB connectors 38 and 39.

The floppy disk drive 31 is connected to the floppy disk drive connector 30. A floppy disk can be mounted and dismounted on/from the floppy disk drive 31. The floppy disk drive 31 exchanges data with the floppy disk. The hard disk drive 33 is connected to the IDE connector 32. The hard disk drive 33 stores an OS, programs and data.

The CD-R/RW drive 35 is connected to the IDE connector 34. A CD-ROM disk and a CD-R/RW disk can be mounted and dismounted on/from the CD-R/RW drive 35. The CD-R/RW drive 35 exchanges data with the CD-ROM disk and the CD-R/RW disk.

ISA devices are mounted on the ISA slots 36. The ROM 37 stores a BIOS and a variety of setting data for starting the device. The keyboard 12 and the mouse 13 are connected to the USB connector 38. USB devices can be mounted on the USB connector 39.

The power supply unit 40 is supplied with a commercial power. When the power supply switch 41 is turned on, the power supply unit 40 generates a direct current power from the commercial power, and supplies the direct current power to the floppy disk drive 31, the hard disk drive 33 and the CD-R/RW drive 35, and also supplies a driving power to a circuit unit. The floppy disk drive 31, the hard disk drive 33 and the CD-R/RW drive 35 are driven by the direct current power supplied from the power supply unit 40. When the power supply switch 41 is turned off, the power supply unit 40 stops supplying the direct current power to each of the units (drives). That is, when the power supply switch 41 of the computer body 11 is turned off, the power supply to the CD-R/RW drive 35 is stopped; and when the power supply switch 41 of the computer body 11 is turned on, the power is supplied to the CD-R/RW drive 35 so that the CD-R/RW drive 35 becomes drivable.

In this course, when the OS is started upon the power supply switch 41 being turned on so that the floppy disk drive 31, the hard disk drive 33 and the CD-R/RW drive 35 are recognized by the OS, the floppy disk drive 31, the hard disk drive 33 and the CD-R/RW drive 35 are managed under the OS such that the floppy disk drive 31, the hard disk drive 33 and the CD-R/RW drive 35 can be controlled by application programs on the OS.

On the other hand, when a user intends to use a CD-R/RW drive with the notebook personal computer 52 incorporating no CD-R/RW drive, an exterior CD-R/RW drive 51 needs to be used, as shown in FIG. 1B, for example.

The CD-R/RW drive 51 is connected to a USB connector 53 of the notebook personal computer 52 by a USB cable 54, for example. Besides, the CD-R/RW drive 51 is driven by a direct current power generated from an alternating current commercial power by an AC adaptor 55.

When the CD-R/RW drive 51 is connected to the USB connector 53 of the notebook personal computer 52 by the USB cable 54, the CD-R/RW drive 51 is recognized by an OS of the notebook personal computer 52 so that the CD-R/RW drive 51 operates under management of the notebook personal computer 52.

In such conventional personal computers as described-above, however, when a drive is recognized by an OS, the drive is controlled in operation under management of the OS; therefore, it has been impossible for the drive to be shared among a plurality of personal computers. Thus, it has not been arranged that a drive incorporated in a desktop personal computer be connected to and used by another personal computer.

Accordingly, when a user intends to use a drive with a notebook computer system, an exterior drive has had to be purchased separately, although a drive is incorporated in a desktop computer system.

SUMMARY OF THE INVENTION

It is a general object of the present invention to provide an improved and useful peripheral device in which the above-mentioned problems are eliminated.

A more specific object of the present invention is to provide a peripheral device having a simple structure including a unit capable of being shared among a plurality of higher-order devices by a simple operation.

In order to achieve the above-mentioned objects, there is provided according to one aspect of the present invention a peripheral device comprising a unit controlled by a higher-order device, a plurality of interface units enabling data to be exchanged between the unit and the higher-order device, and a control unit enabling data to be exchanged between the unit and the higher-order device by using one of the interface units.

According to the present invention, a unit of a peripheral device can be shared among a plurality of higher-order devices.

Other objects, features and advantages of the present invention will become more apparent from the following detailed description when read in conjunction with the accompanying drawings.

DETAILED DESCRIPTION OF THE PREFERRED EMBODIMENTS

A description will now be given of a peripheral device according to the present invention by taking a built-in CD-R/RW drive incorporated in a desktop computer system as an example thereof.

Figure 2:
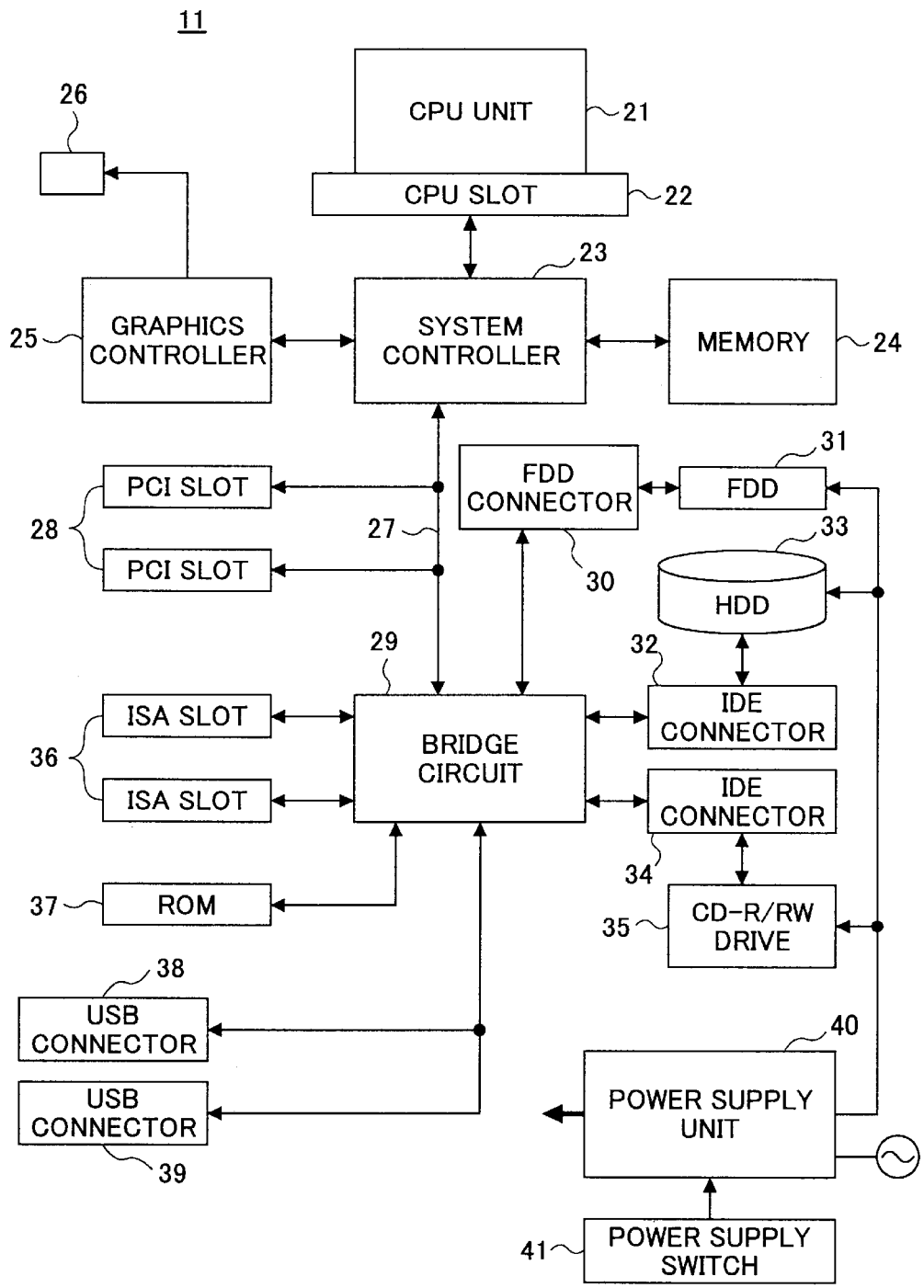
FIG. 2 is a block diagram of a computer body shown in FIG. 1A.
Figure 3:
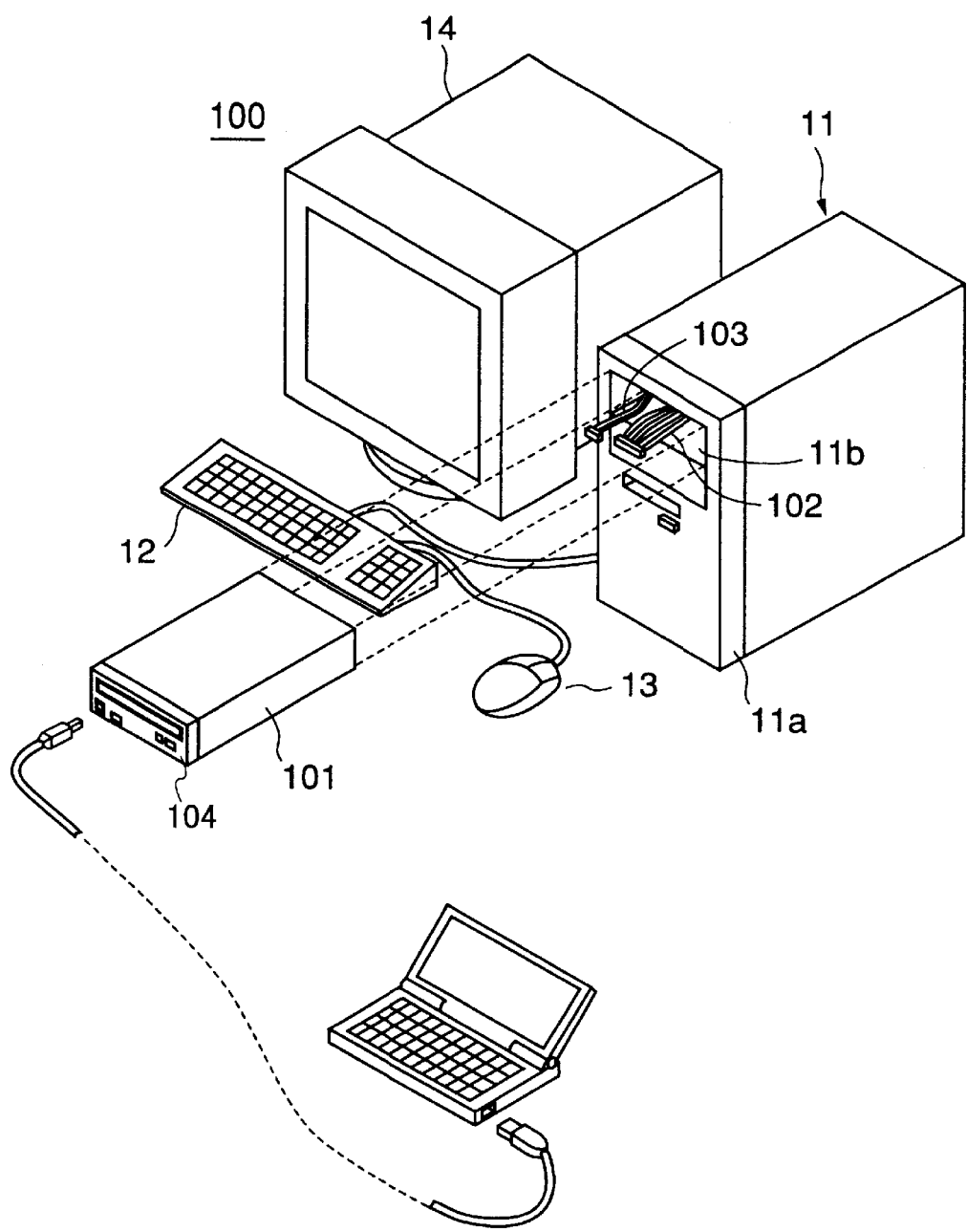
FIG. 3 is a system configuration diagram of a desktop personal computer according to an embodiment of the present invention.
Figure 4:
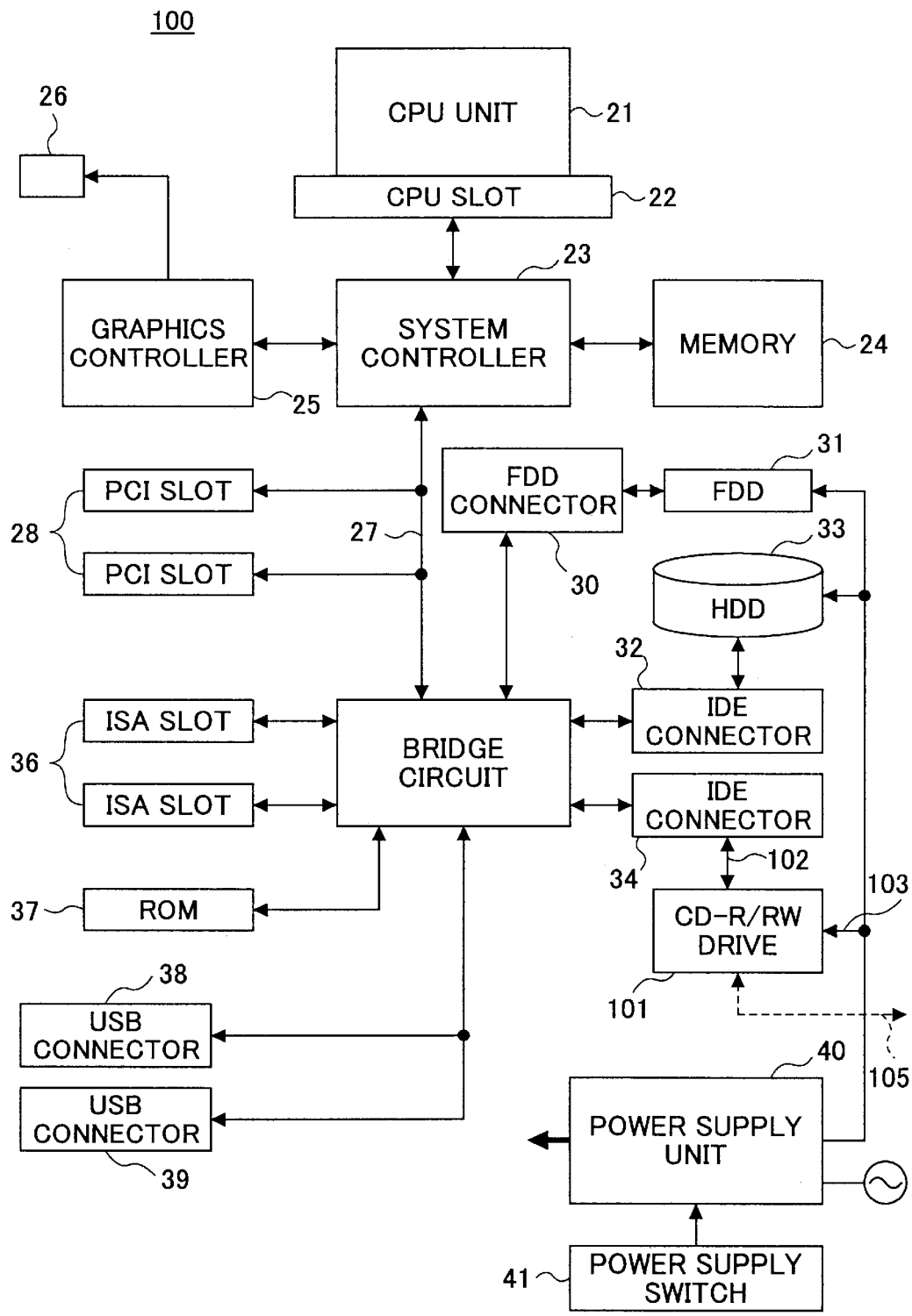
FIG. 4 is a block diagram of the desktop personal computer shown in FIG. 3.

FIG. 3 is a system configuration diagram of a desktop personal computer 100 according to an embodiment of the present invention. FIG. 4 is a block diagram of the desktop personal computer 100. Elements in FIG. 3 and FIG. 4 that are identical to the elements shown in FIG. 1A to FIG. 2 are referenced by the same reference marks, and will not be described in detail.

Figure 1A:
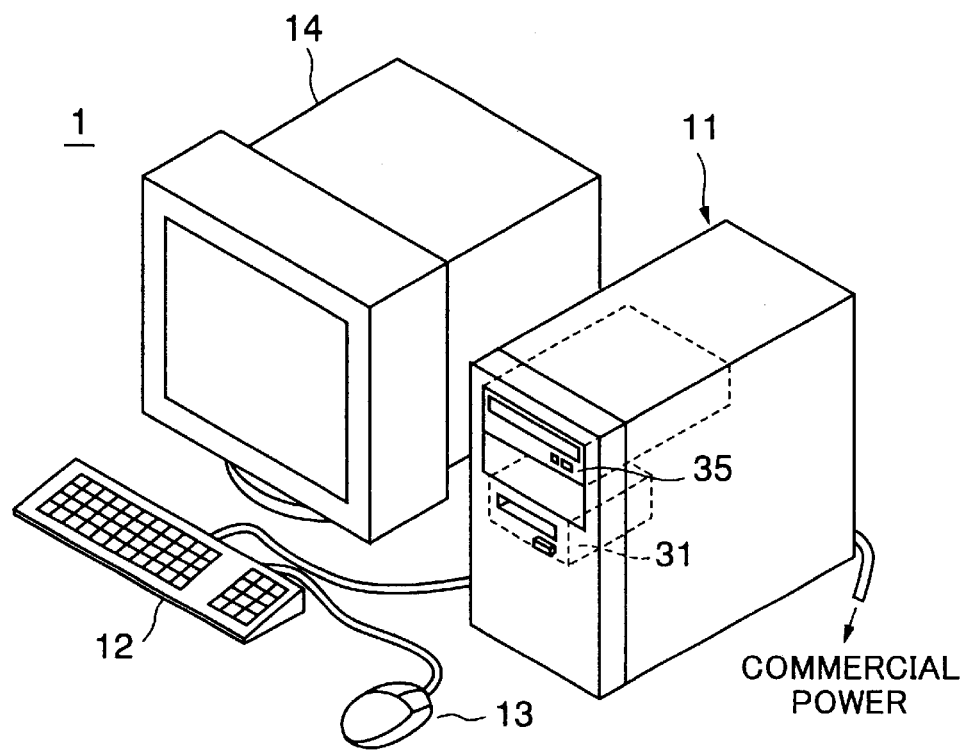
FIG. 1A is a perspective view of a conventional desktop computer.
Figure 1B:
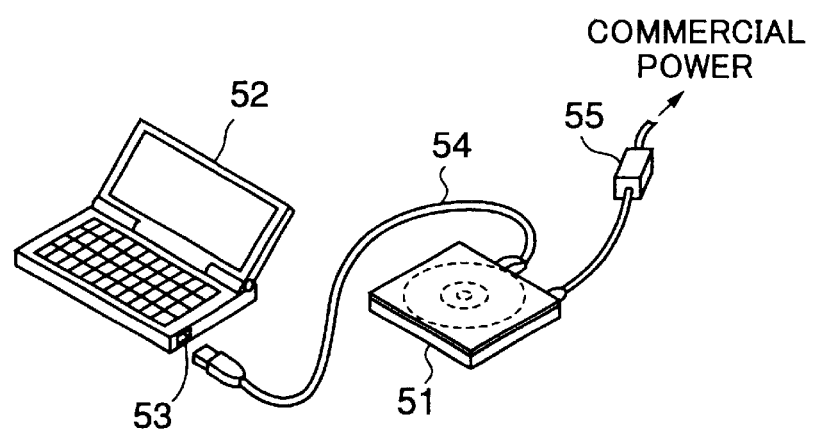
FIG. 1B is a perspective view of a conventional notebook computer.

The desktop personal computer 100 according to the present embodiment is different from the desktop (personal) computer 1 shown in FIG. 1A to FIG. 2 in regard of a configuration of a CD-R/RW drive 101. The CD-R/RW drive 101 is incorporated in the computer body 11 according to the present embodiment. The CD-R/RW drive 101 is connected via an IDE cable 102 to the IDE connector 34 incorporated in the computer body 11, and is connected via a power supply cable 103 to the power supply unit 40 incorporated in the computer body 11. The CD-R/RW drive 101, connected with the IDE cable 102 and the power supply cable 103, is mounted on an extension bay 11b formed in a front panel 11a of the computer body 11. When the CD-R/RW drive 101 is mounted on the extension bay 11b of the computer body 11, the surface of a front panel 104 of the CD-R/RW drive 101 is exposed from the front panel 11a of the computer body 11.

Next, a description will be given of the configuration of the CD-R/RW drive 101.

Figure 5:
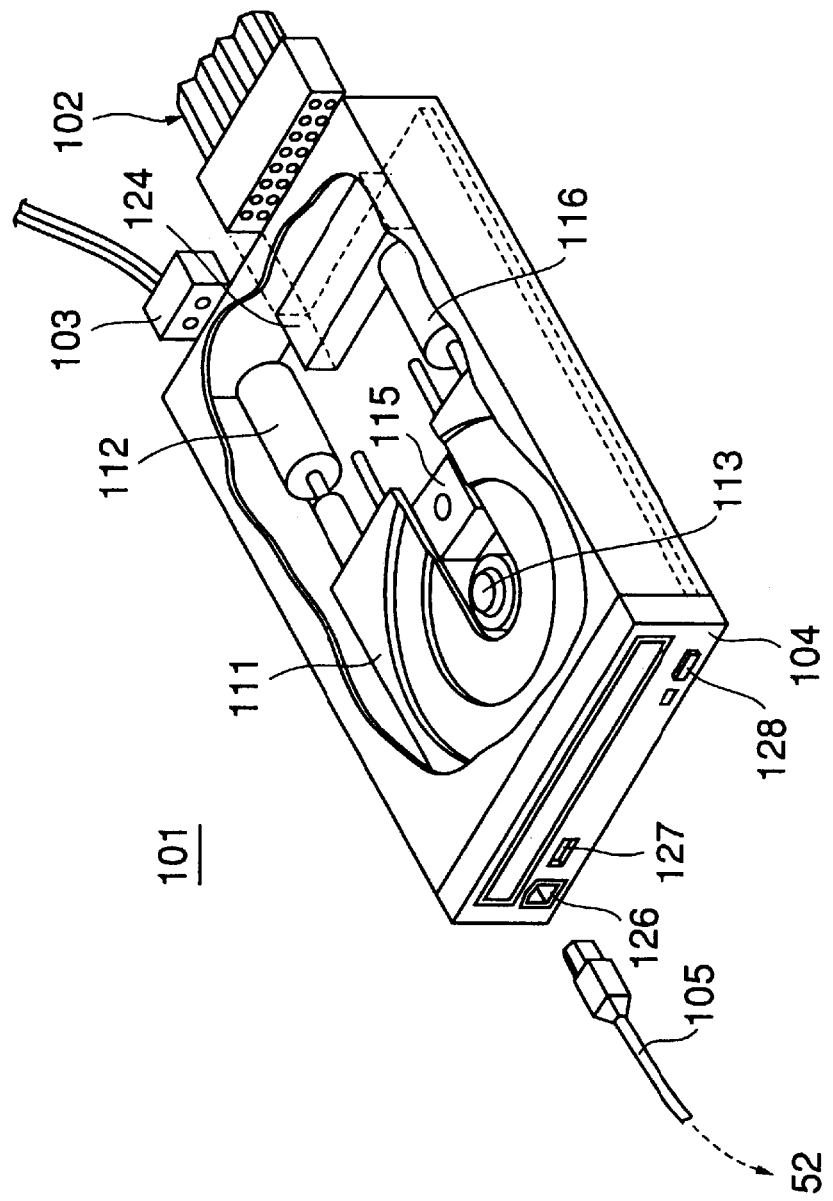
FIG. 5 is a perspective view of a CD-R/RW drive shown in FIG. 3.
Figure 6:
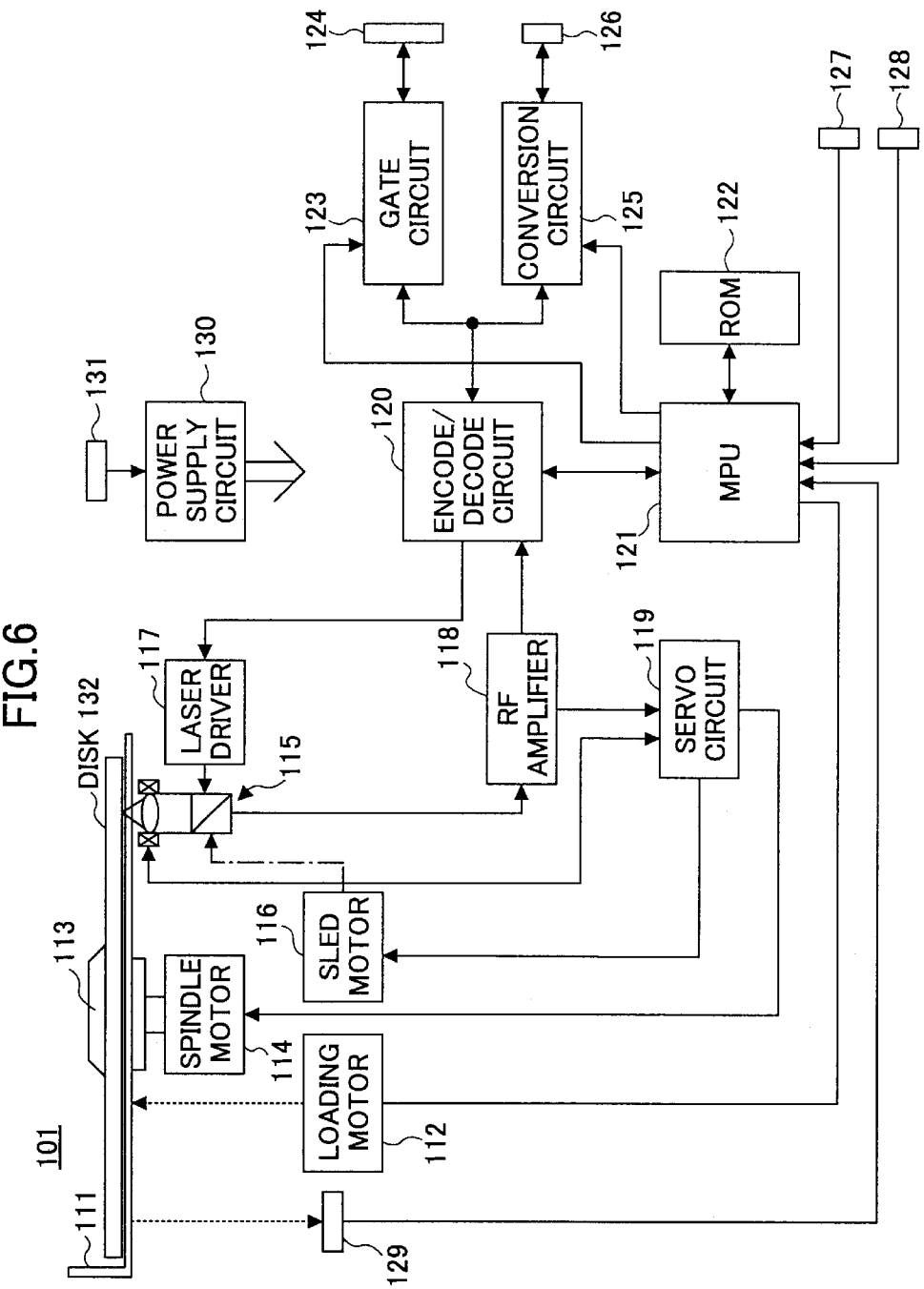
FIG. 6 is a block diagram of the CD-R/RW drive shown in FIG. 5.

FIG. 5 is a perspective view of the CD-R/RW drive 101. FIG. 6 is a block diagram of the CD-R/RW drive 101.

The CD-R/RW drive 101 includes a tray 111, a loading motor 112, a turntable 113, a spindle motor 114, a pickup 115, a sled motor 116, a laser driver 117, an RF (radio frequency; high frequency) amplifier 118, a servo circuit 119, an encode/decode circuit 120, an MPU (micro-processing unit) 121, a ROM 122, a gate circuit 123, an IDE connector 124 (an interface unit), a USB-ATAPI (advanced technology attachment packet interface) conversion circuit 125, a USB connector 126 (an interface unit), a switch 127, a tray open/close switch (an eject switch; an eject button) 128, a tray open/close detection unit 129, a power supply circuit 130, and a power supply connector 131. At least the MPU 121 composes a control unit. At least the switch 127 composes a selection unit.

In a state where the tray 111 is pulled out, a disk 132 is mounted. When the tray open/close switch 128 is operated in the state where the tray 111 is pulled out, the MPU 121 recognizes this operation so that the loading motor 112 is driven. The tray 111 engages the loading motor 112; therefore, when the loading motor 112 is driven, the tray 111 is thereby pulled into the device (the CD-R/RW drive 101).

When the tray 111 is pulled into the device, the disk 132 is mounted on the turntable 113. The turntable 113 is fixed to a rotary shaft of the spindle motor 114 so that the turntable 113 rotates with the rotation of the spindle motor 114. The spindle motor 114 rotates at a predetermined rotation speed by a driving signal from the servo circuit 119. The turntable 113 rotates due to the rotation of the spindle motor 114 so that the disk 132 rotates at the predetermined rotation speed.

Additionally, when the disk 132 is mounted on the turntable 113, the pickup 115 is positioned opposite the disk 132.

The pickup 115 incorporates a laser diode and a photodetector not shown in the figure so as to apply a laser beam emitted from the laser diode onto the disk 132, and detect the reflected light by the photodetector. A detection signal detected by the pickup 115 is supplied to the RF amplifier 118. The RF amplifier 118 amplifies the detection signal supplied from the pickup 115, and supplies the amplified detection signal to the servo circuit 119 and to the encode/decode circuit 120.

The encode/decode circuit 120 demodulates the signal detected by the pickup 115 so as to decode data represented by the signal, and performs a control for an interface compliant to ATAPI. The decoded data is supplied to the gate circuit 123 and the conversion circuit 125.

The gate circuit 123 is controlled by the MPU 121, and connects or disconnects the encode/decode circuit 120 and the IDE connector 124. The conversion circuit 125 is connected between the USB connector 126 and the encode/decode circuit 120 so as to convert data between the USB connector 126 and the encode/decode circuit 120. Besides, the conversion circuit 125 is controlled by the MPU 121 so as to enable/disenable operations thereof.

The MPU 121 operates on firmware stored in the ROM 122 so as to control the CD-R/RW drive 101 as a whole.

The IDE connector 124 is provided at a backside of the CD-R/RW drive 101, and is connected to the IDE connector 34 by the IDE cable 102. Besides, the position for providing the IDE connector 124 is not limited to the backside of the CD-R/RW drive 101, and may be a position inside the computer body 11 where the IDE cable 102 can be connected.

The USB connector 126 is a B-type USB connector for example, and can be engaged to a B-type USB connector end of a USB cable 105. The USB connector 126 is so mounted as to be exposed at the front surface of the front panel 104, as shown in FIG. 5.

The switch 127 is composed of a slide switch, and is so mounted as to be exposed at the front surface of the front panel 104. The switch 127 is so mounted that an operation part thereof does not protrude from the front surface of the front panel 104. For instance, the switch 127 is so mounted as to recede from the front surface of the front panel 104, or a part of the front panel 104 around the switch 127 is formed in a protruding form. Thereby, the switch 127 can be prevented from being operated erroneously.

The eject switch 128 is a push switch which is operated upon pulling out the tray 111 and housing the tray 111 into the device. An eject process as described hereinafter is executed by the eject switch 128.

Besides, in the CD-R/RW drive 101 according to the present embodiment, the USB connector 126, the switch 127 and the eject switch 128 are provided at the front surface of the front panel 104, because the front surface of the front panel 104 is exposed from the front surface of the computer body 11; accordingly, the positions for providing the USB connector 126, the switch 127 and the eject switch 128 are not limited to the front surface of the front panel 104, and may be other positions of the CD-R/RW drive 101 which are exposed from the computer body 11.

Figure 7:
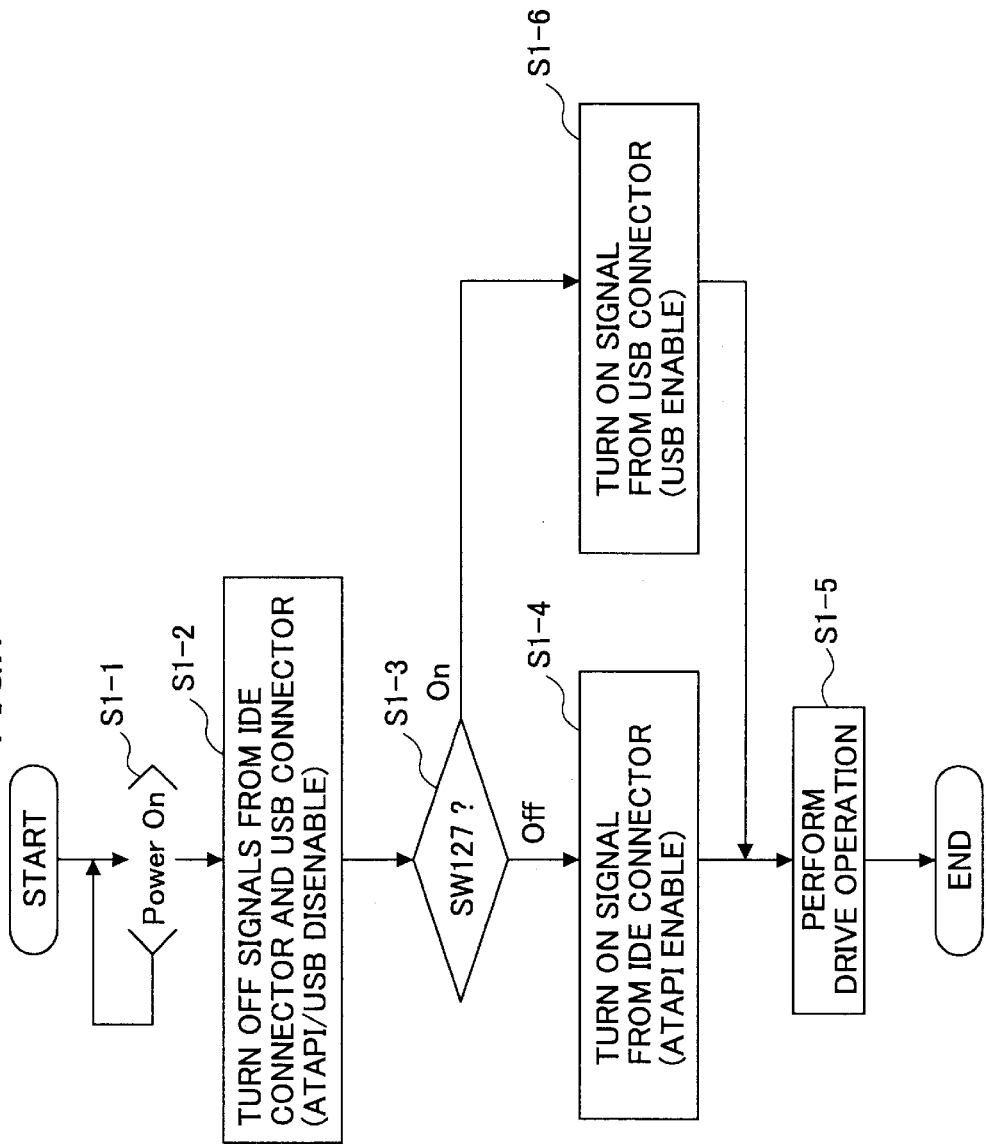
FIG. 7 is an operational flowchart of a process conducted by an MPU of the CD-R/RW drive shown in FIG. 6.

FIG. 7 is an operational flowchart of a process conducted by the MPU 121 of the CD-R/RW drive 101.

When the power is supplied from the power supply unit 40 of the computer body 11 to the power supply circuit 130 in step S1-1, the MPU 121 turns off the gate circuit 123, and disenables the conversion circuit 125 in step S1-2. Next, the MPU 121 judges whether the switch 127 is on or off in step S1-3.

When the switch 127 is off in step S1-3, the MPU 121 judges that the CD-R/RW drive 101 is used as a drive of the computer body 11. Then, the MPU 121 turns on the gate circuit 123 so as to connect the IDE connector 124 to the encode/decode circuit 120 in step S1-4, and brings the drive into operation in step S1-5.

Thus, the CD-R/RW drive 101 is recognized by the computer body 11, and operates as the drive of the computer body 11.

On the other hand, when the switch 127 is on in step S1-3, the MPU 121 judges that the CD-R/RW drive 101 is used as a drive of a computer connected to the USB connector 126. Then, the MPU 121 enables the conversion circuit 125 in step S1-6. By enabling the conversion circuit 125, the USB connector 126 is connected to the encode/decode circuit 120. Subsequently, the MPU 121 brings the drive into operation in step S1-5 in the state where the USB connector 126 is connected to the encode/decode circuit 120 via the conversion circuit 125.

Thus, the CD-R/RW drive 101 operates as the drive of the computer connected to the USB connector 126.

Accordingly, upon switching the connection of the CD-R/RW drive 101, the OS of the computer body 11 is closed, and the power supply is stopped; thereafter, the switch 127 is turned on/off; and thereafter, the power supply of the computer body 11 is applied again. When the switch 127 is on, the CD-R/RW drive 101 operates as the drive of the computer connected to the USB connector 126 with the USB connector 126 functioning as an interface therewith. When the switch 127 is off, the CD-R/RW drive 101 operates as the drive of the computer body 11 with the IDE connector 124 functioning as an interface therewith.

Besides, in the present invention, upon switching the connection of the CD-R/RW drive 101, the OS of the computer body 11 is restarted; however, it is also possible to switch the connection of the CD-R/RW drive 101 at any time.

Figure 8:
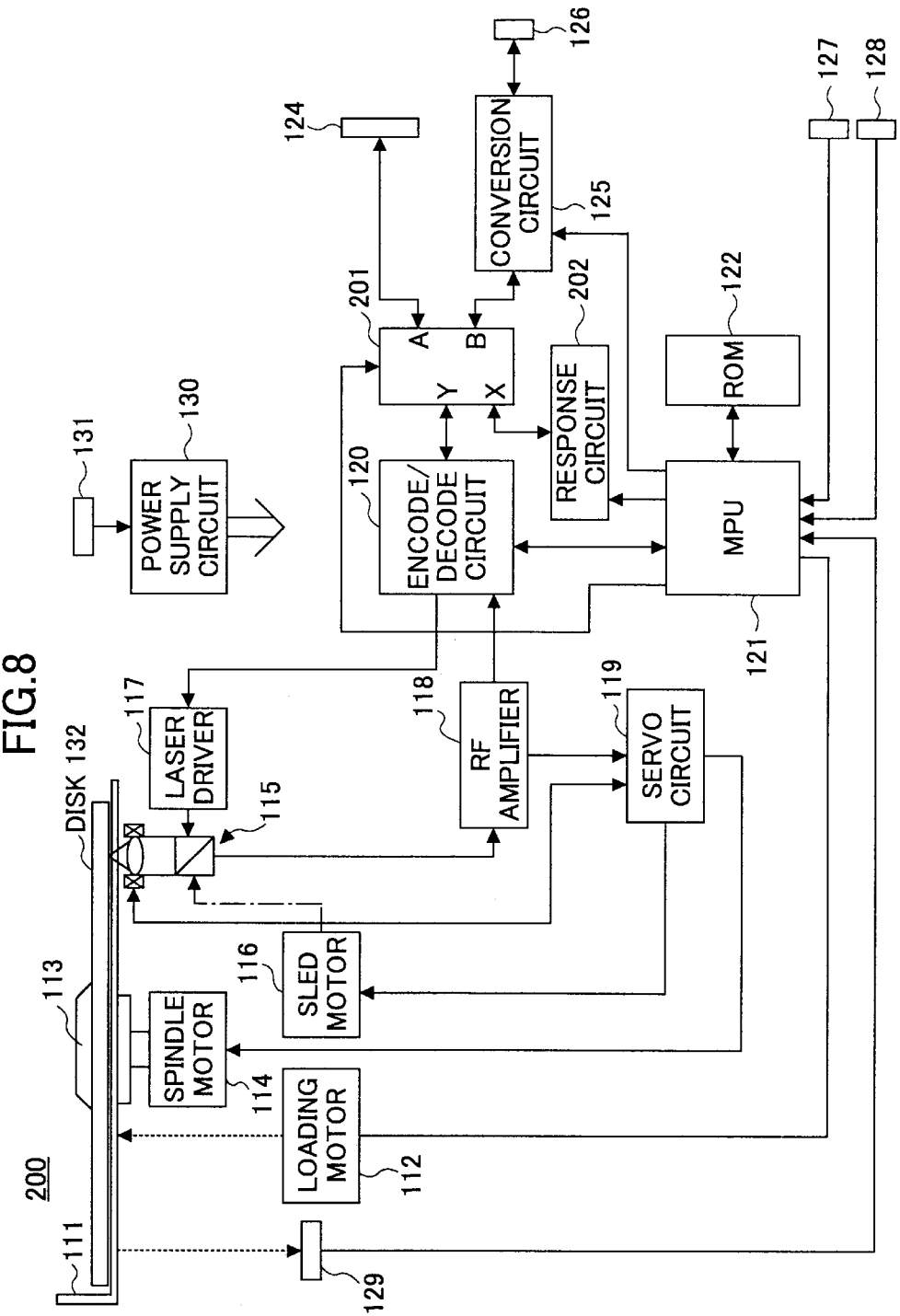
FIG. 8 is a block diagram of a first variation of the CD-R/RW drive.

FIG. 8 is a block diagram of a first variation of the CD-R/RW drive. Elements in FIG. 8 that are identical to the elements shown in FIG. 6 are referenced by the same reference marks, and will not be described in detail.

A CD-R/RW drive 200 according to the present variation further includes a connection switching circuit 201 and a response circuit 202, and the process conducted by the MPU 121 is changed. The IDE connector 124 is connected to an A-terminal of the connection switching circuit 201. The conversion circuit 125 is connected to a B-terminal of the connection switching circuit 201. The response circuit 202 is connected to an X-terminal of the connection switching circuit 201. The encode/decode circuit 120 is connected to a Y-terminal of the connection switching circuit 201. The connection switching circuit 201 switches connections between the A/B-terminal and the X/Y-terminal according to a switching signal supplied from the MPU 121.

When the switching signal supplied from the MPU 121 is high-level, the connection switching circuit 201 connects the A-terminal to the X-terminal, and connects the B-terminal to the Y-terminal. On the other hand, when the switching signal supplied from the MPU 121 is low-level, the connection switching circuit 201 connects the A-terminal to the Y-terminal, and connects the B-terminal to the X-terminal. The response circuit 202 is connected to the X-terminal of the connection switching circuit 201. Upon receiving a request command, such as a read or write command, from the X-terminal, the response circuit 202 supplies the X-terminal with a response command to the effect that no disk is present.

Next, a description will be given of the process conducted by the MPU 121.

Figure 9:
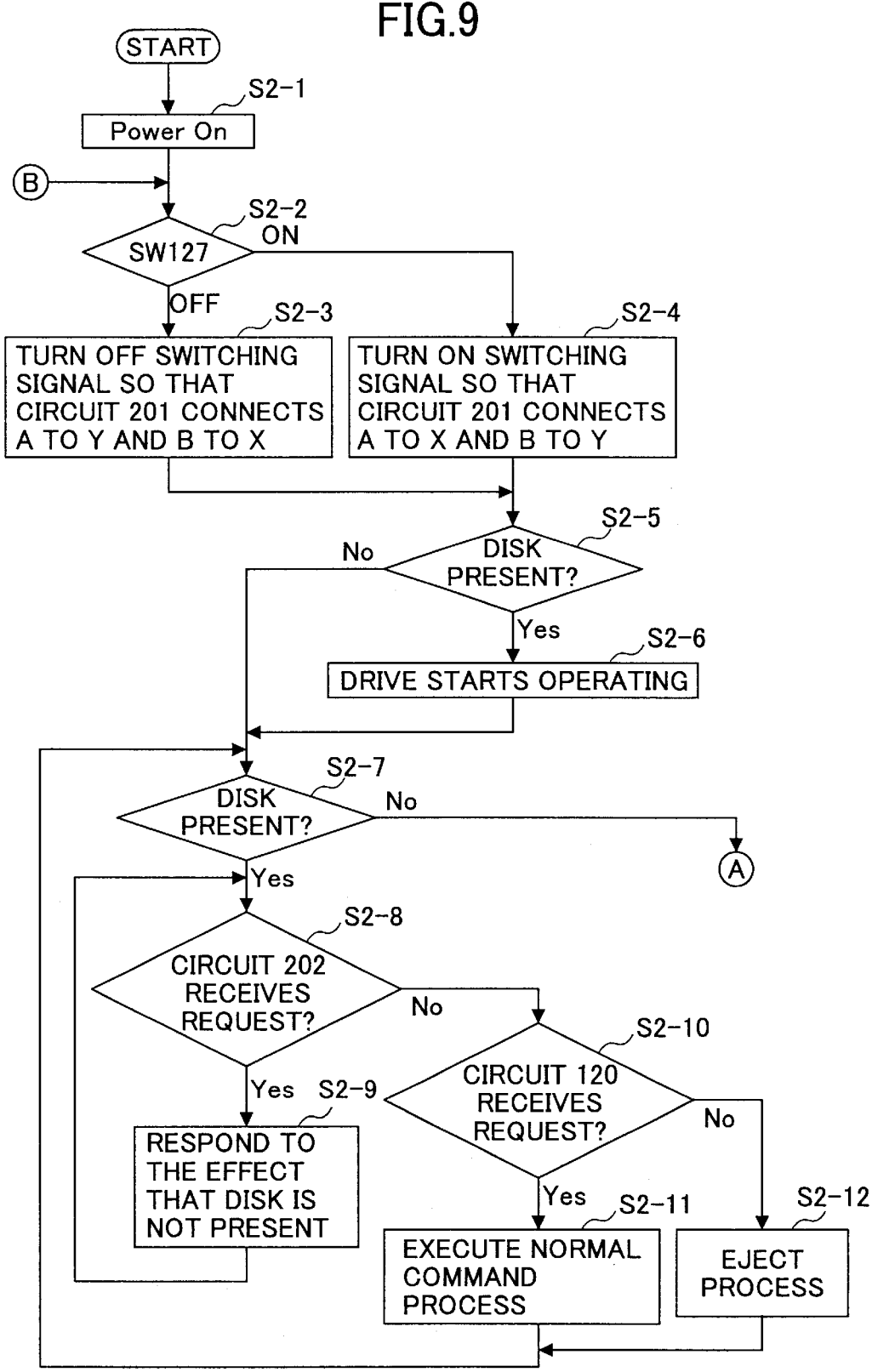
FIG. 9 and FIG. 10 are flowcharts of a process conducted by the MPU according to the present variation.
Figure 10:
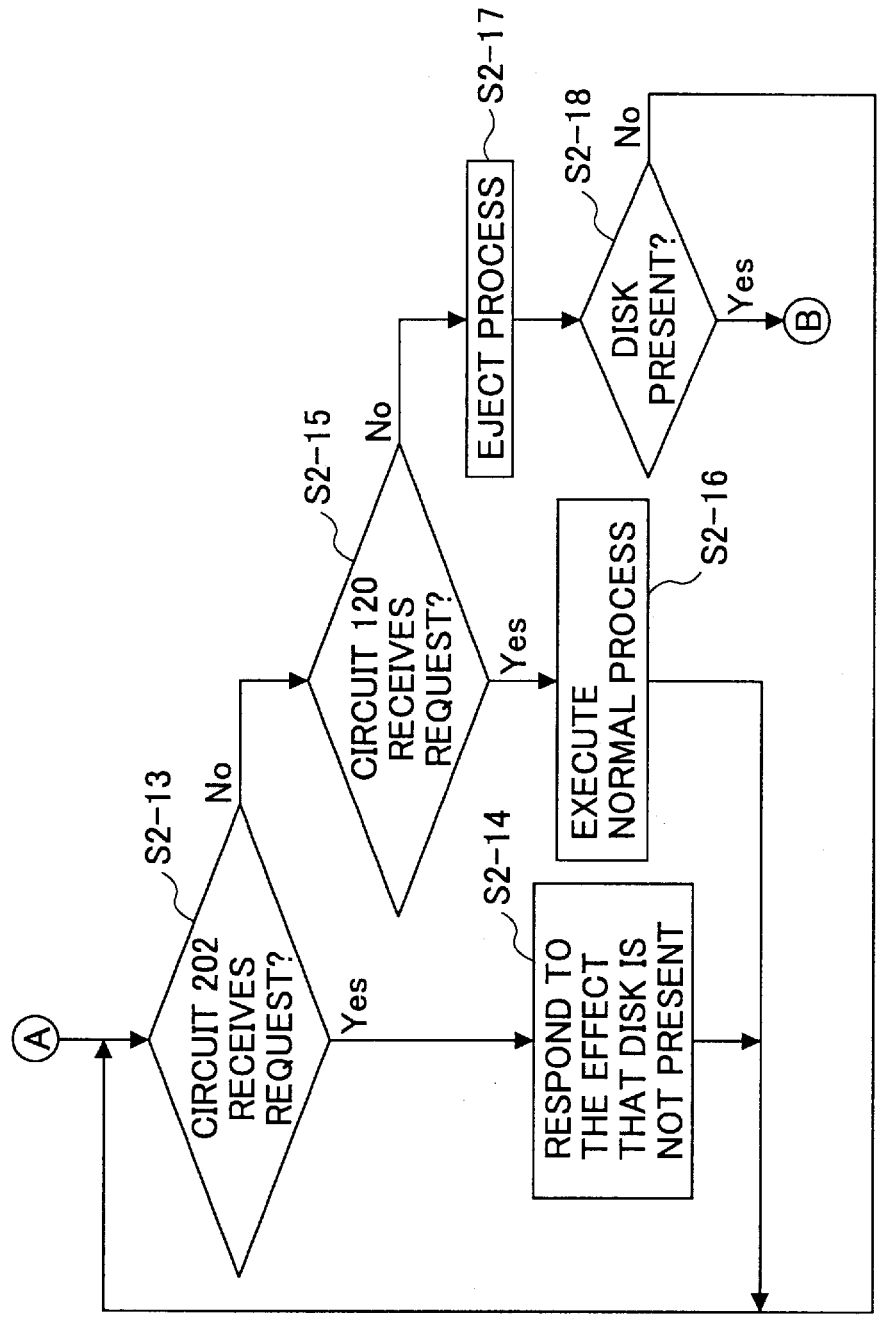

FIG. 9 and FIG. 10 are flowcharts of the process conducted by the MPU 121 according to the present variation.

When the power supply of the computer body 11 is turned on, and the power is supplied from the computer body 11 to the power supply circuit 130 in step S2-1, the MPU 121 judges whether the switch 127 is on or off in step S2-2.

When the switch 127 is judged to be off in step S2-2, the MPU 121 makes the switching signal to supply to the connection switching circuit 201 low-level in step S2-3. According to the switching signal, the connection switching circuit 201 connects the A-terminal to the Y-terminal, and connects the B-terminal to the X-terminal. In this state, the IDE connector 124 is connected to the encode/decode circuit 120, and the conversion circuit 125 is connected to the response circuit 202.

On the other hand, when the switch 127 is judged to be on in step S2-2, the MPU 121 makes the switching signal to supply to the connection switching circuit 201 high-level in step S2-4. According to the switching signal, the connection switching circuit 201 connects the A-terminal to the X-terminal, and connects the B-terminal to the Y-terminal. In this state, the IDE connector 124 is connected to the response circuit 202, and the conversion circuit 125 is connected to the encode/decode circuit 120.

Next, in step S2-5, it is judged whether or not the disk 132 is recognized. When the disk 132 is recognized in step S2-5, the CD-R/RW drive 200 is caused to start operating in step S2-6.

When the disk 132 is not recognized in step S2-5, or when the CD-R/RW drive 200 is being operated in step S2-6, the MPU 121 judges in step S2-7 whether or not the disk 132 is recognized. When the disk 132 is recognized in step S2-7, the MPU 121 judges in step S2-8 whether or not the response circuit 202 receives a request.

When the response circuit 202 receives a request in step S2-8, the MPU 121 causes the response circuit 202 to respond to the effect that the disk is not recognized, in step S2-9. When the encode/decode circuit 120 receives a request in step S2-10, the MPU 121 executes operations according to the request in step S2-11, and thereafter, the process returns to step S2-7. When the eject process is performed in step S2-12, the process returns to step S2-7.

Here, a description will be given of the eject process.

Figure 11:
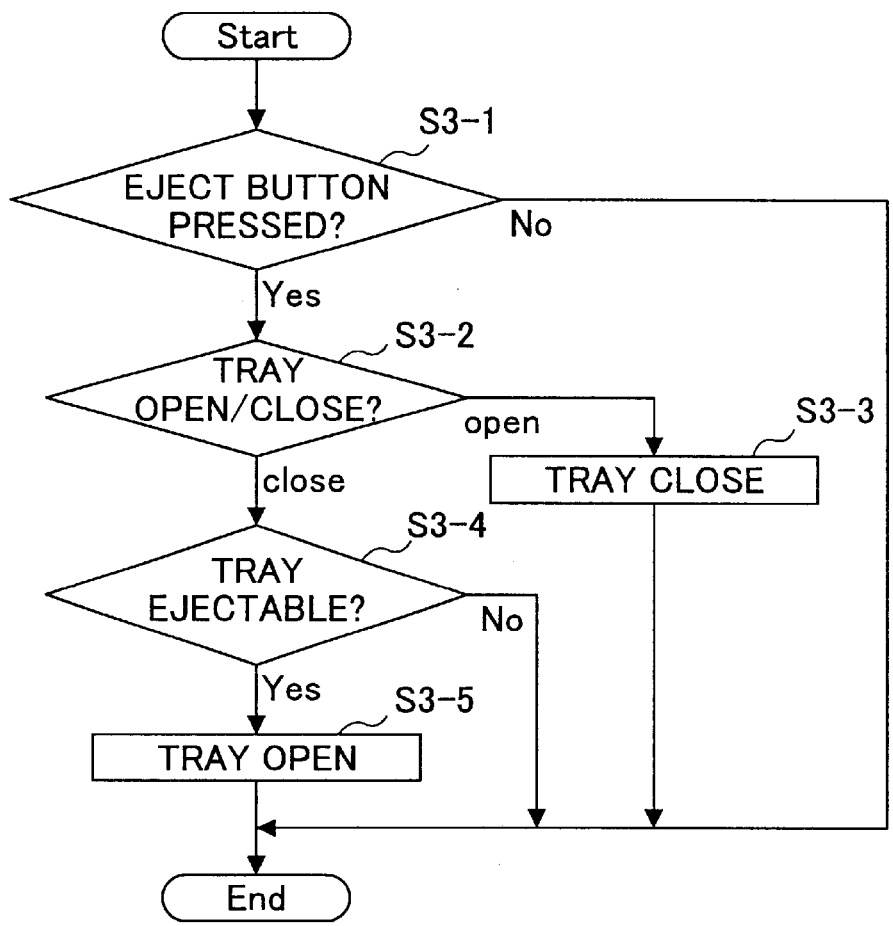
FIG. 11 is a flowchart of an eject process.

FIG. 11 is a flowchart of the eject process.

In the eject process, it is judged whether or not the eject button 128 is operated in step S3-1. When the eject button 128 is operated in step S3-1, it is judged in step S3-2 whether the tray 111 is open or close according to a detection signal supplied from the tray open/close detection unit 129.

When it is judged in step S3-2 that the tray 111 is open, the MPU 121 controls the loading motor 112 to close the tray 111 in step S3-3, whereby the process ends.

When it is judged in step S3-2 that the tray 111 is close, it is judged whether or not the tray 111 is in an ejectable state in step S3-4. When the tray 111 is in an ejectable state in step S3-4, the MPU 121 controls the loading motor 112 to open the tray 111 in step S3-5, whereby the process ends. On the other hand, when the tray 111 is not in an ejectable state in step S3-4, the process ends.

Thus, the eject process is finished.

Here, the description will be continued of the process being described above with reference to FIG. 9 and FIG. 10.

When the disk 132 is not recognized in step S2-7, it is judged in step S2-13 whether or not the response circuit 202 receives a request. When the response circuit 202 receives a request in step S2-13, the MPU 121 causes the response circuit 202 to respond to the effect that the disk is not recognized, in step S2-14. When the encode/decode circuit 120 receives a request in step S2-15, the MPU 121 executes operations according to the request in step S2-16.

When the eject process is performed in step S2-17, the MPU 121 judges in step S2-18 whether or not the disk 132 is recognized. When the disk 132 is judged to be not recognized in step S2-18, the process returns to and continues from step S2-13. On the other hand, when the disk 132 is recognized in step S2-18, the process returns to and continues from step S2-2. An exchange of the disk 132 can be recognized by the foregoing step S2-17 and step S2-18.

Thus, according to the present variation, upon applying the power or exchanging the disk, the switch 127 is judged to be whether on or off so that the connection switching circuit 201 switches the connections. Accordingly, by turning on/off the switch 127 prior to exchanging the disk, the IDE connector 124 and the USB connector 126 can be switched without restarting the computer body 11.

Besides, in the above-described embodiment, the connections between the encode/decode circuit 120 and each of the IDE connector 124 and the USB connector 126 are switched by turning on/off the switch 127; however, the connections may be switched when a computer is connected to the USB connector 126, and the computer body 11 is restarted, or when the disk is exchanged.

Figure 12:
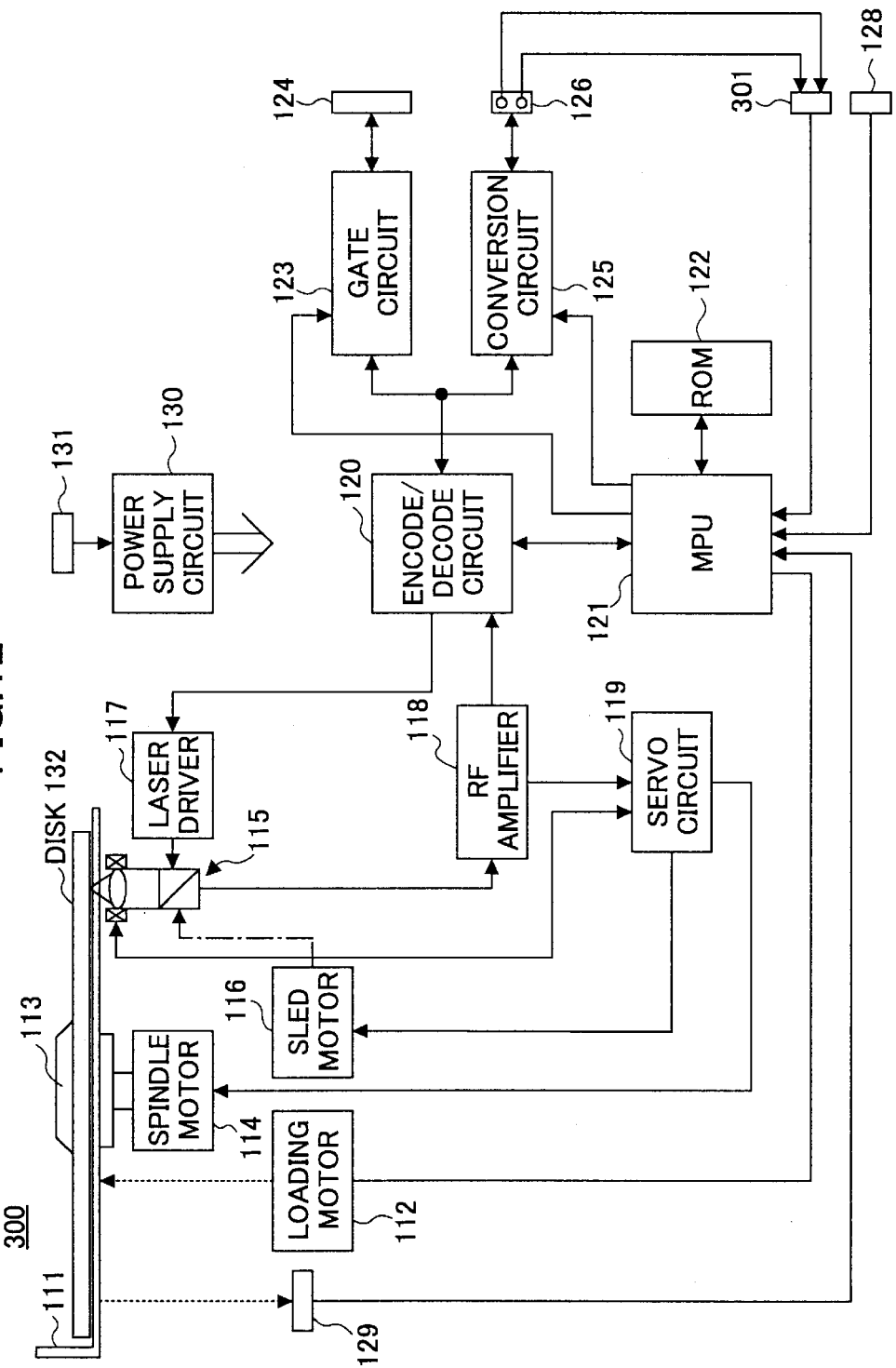
FIG. 12 is a block diagram of a second variation of the CD-R/RW drive.

FIG. 12 is a block diagram of a second variation of the CD-R/RW drive according to the present embodiment. Elements in FIG. 12 that are identical to the elements shown in FIG. 6 are referenced by the same reference marks, and will not be described in detail.

A CD-R/RW drive 300 according to the present variation comprises a voltage detection circuit 301 in place of the switch 127 of the CD-R/RW drive 101 shown in FIG. 6. At least the voltage detection circuit 301 composes a selection unit. It is arranged that, when a computer is connected to the USB connector 126, a voltage of 5 [V] is impressed between a power supply terminal and a ground terminal of the USB connector 126. The voltage detection circuit 301 detects the voltage impressed between the power supply terminal and the ground terminal of the USB connector 126 so as to switch the connections between the encode/decode circuit 120 and each of the IDE connector 124 and the USB connector 126.

The voltage detection circuit 301 is connected between the power supply terminal and the ground terminal of the USB connector 126. The voltage detection circuit 301 detects the voltage between the power supply terminal and the ground terminal, and compares the detected voltage with a reference voltage so as to output a result of the comparison. When the voltage between the power supply terminal and the ground terminal is larger than the reference voltage of 3 volts, for example, the voltage detection circuit 301 outputs a high-level signal. When the voltage between the power supply terminal and the ground terminal is smaller than 3 volts, the voltage detection circuit 301 outputs a low-level signal. The output of the voltage detection circuit 301 is supplied to the MPU 121.

Figure 13:
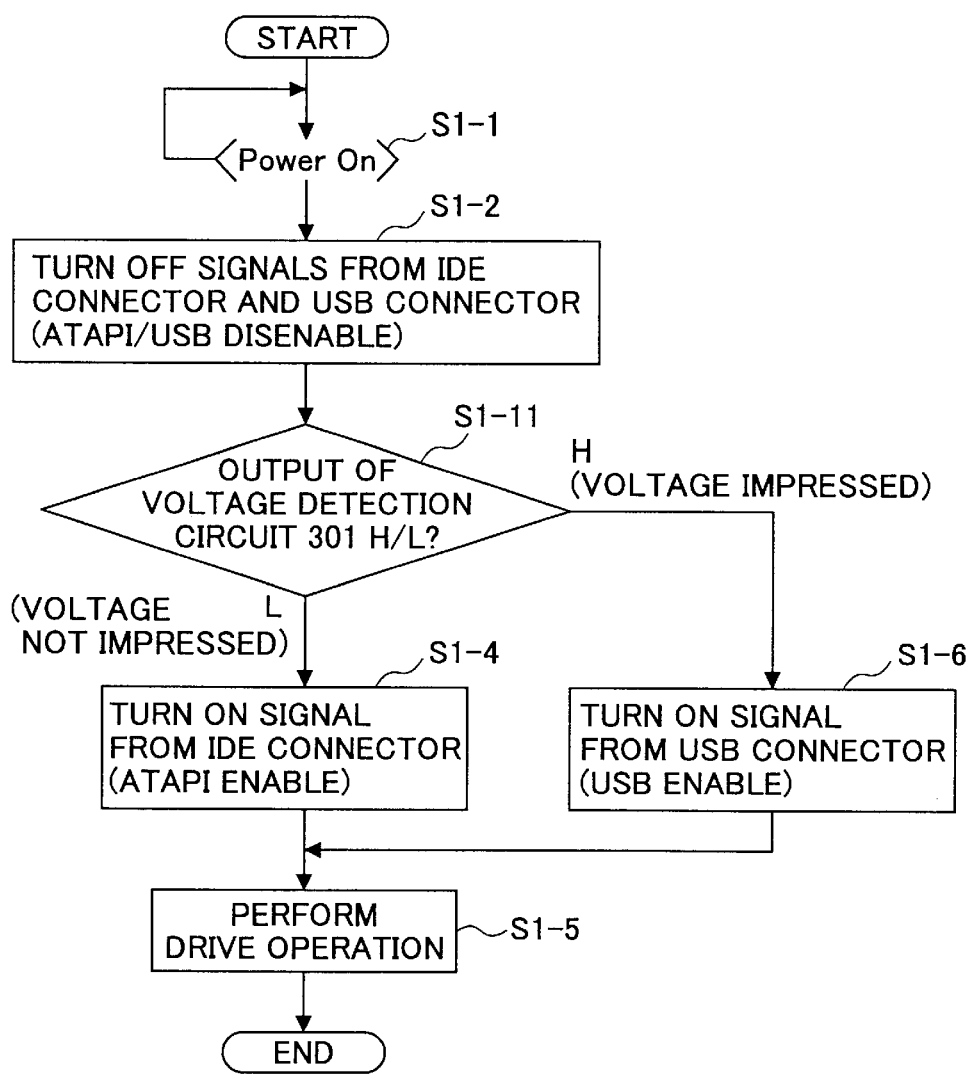
FIG. 13 is a process flowchart of the second variation.

FIG. 13 is a process flowchart of the second variation according to the present embodiment. Elements in FIG. 13 that are identical to the elements shown in FIG. 7 are referenced by the same reference marks, and will not be described in detail.

In place of the judgment of whether the switch 127 is on or off made in step S1-3 shown in FIG. 7, the output of the voltage detection circuit 301 is used in making the following judgment. That is, when the output of the voltage detection circuit 301 is high-level in step S1-11, step S1-6 is performed because it can be judged that a computer is connected to the USB connector 126. On the other hand, when the output of the voltage detection circuit 301 is low-level in step S1-11, step S1-4 is performed because it can be judged that no computer is connected to the USB connector 126.

According to the present variation, inserting a USB cable from a computer into the USB connector 126 enables an automatic switching of the connection to the computer.

Besides, in place of the switch 127, the method of detecting a computer being connected to the USB connector 126 is applicable to the first variation.

Figure 14:
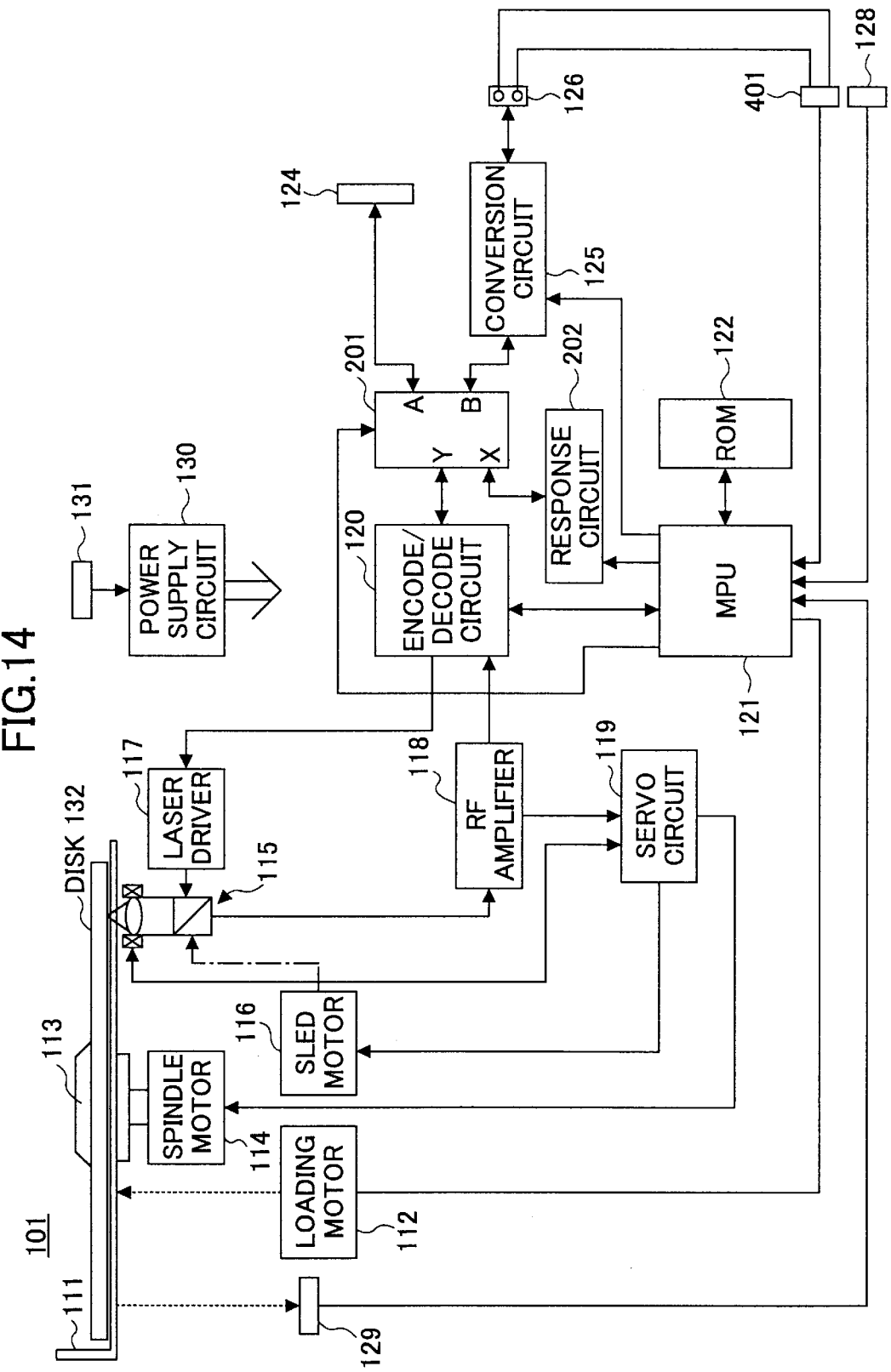
FIG. 14 is a block diagram of a third variation of the CD-R/RW drive.

FIG. 14 is a block diagram of a third variation of the CD-R/RW drive according to the present embodiment. Elements in FIG. 14 that are identical to the elements shown in FIG. 8 are referenced by the same reference marks, and will not be described in detail.

A CD-R/RW drive 400 according to the present variation comprises a voltage detection circuit 401 in place of the switch 127 of the CD-R/RW drive 200 shown in FIG. 8. At least the voltage detection circuit 401 composes a selection unit. It is arranged that, when a computer is connected to the USB connector 126, a voltage of 5 [V] is impressed between a power supply terminal and a ground terminal of the USB connector 126. The voltage detection circuit 401 detects the voltage impressed between the power supply terminal and the ground terminal of the USB connector 126 so as to switch the connections between the encode/decode circuit 120 and each of the IDE connector 124 and the USB connector 126.

The voltage detection circuit 401 is connected between the power supply terminal and the ground terminal of the USB connector 126. The voltage detection circuit 401 detects the voltage between the power supply terminal and the ground terminal, and compares the detected voltage with a reference voltage so as to output a result of the comparison. When the voltage between the power supply terminal and the ground terminal is larger than the reference voltage of 3 volts, for example, the voltage detection circuit 401 outputs a high-level signal. When the voltage between the power supply terminal and the ground terminal is smaller than 3 volts, the voltage detection circuit 401 outputs a low-level signal. The output of the voltage detection circuit 401 is supplied to the MPU 121.

Figure 15:
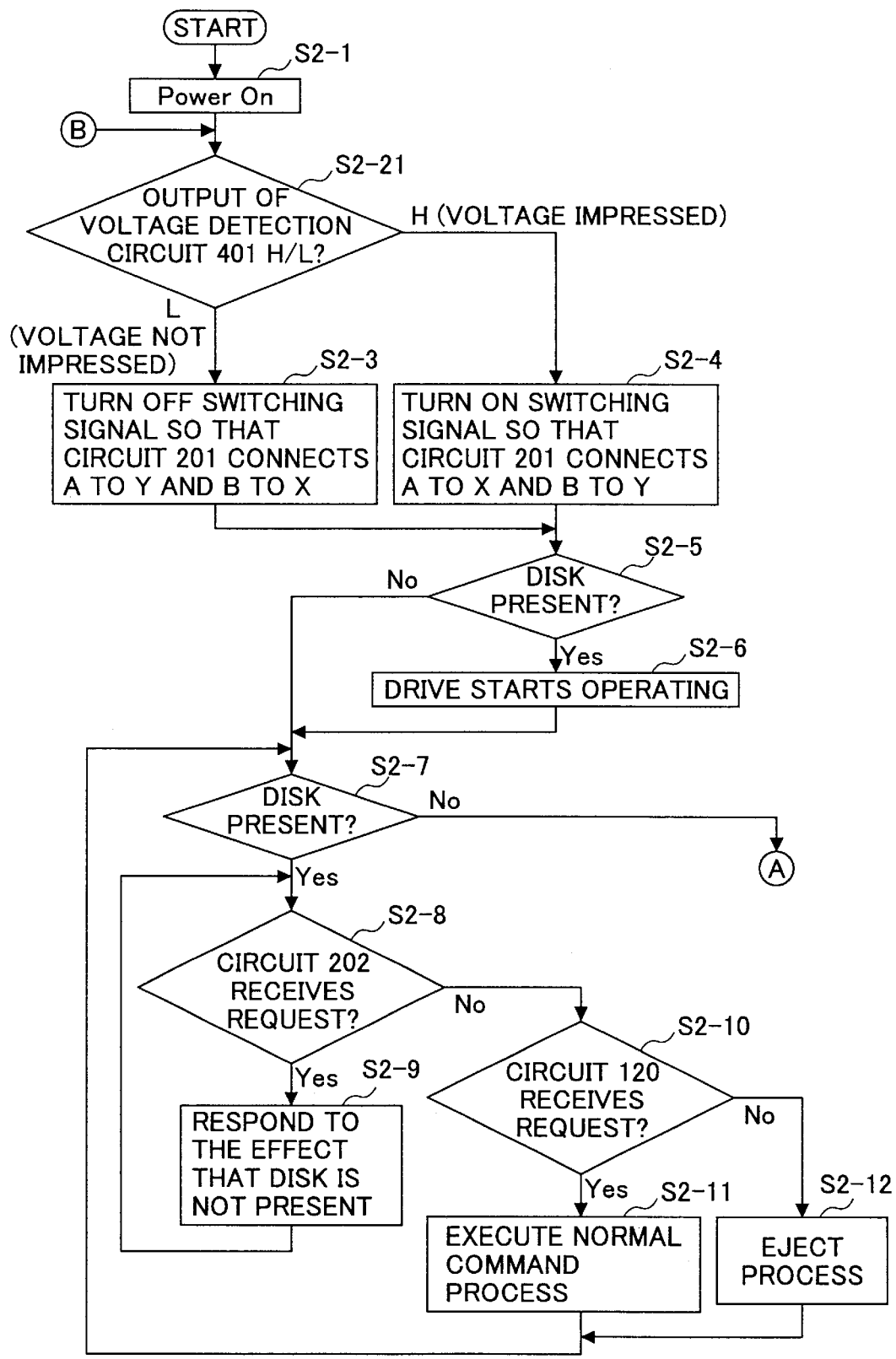
FIG. 15 and FIG. 16 are process flowcharts of the third variation.
Figure 16:
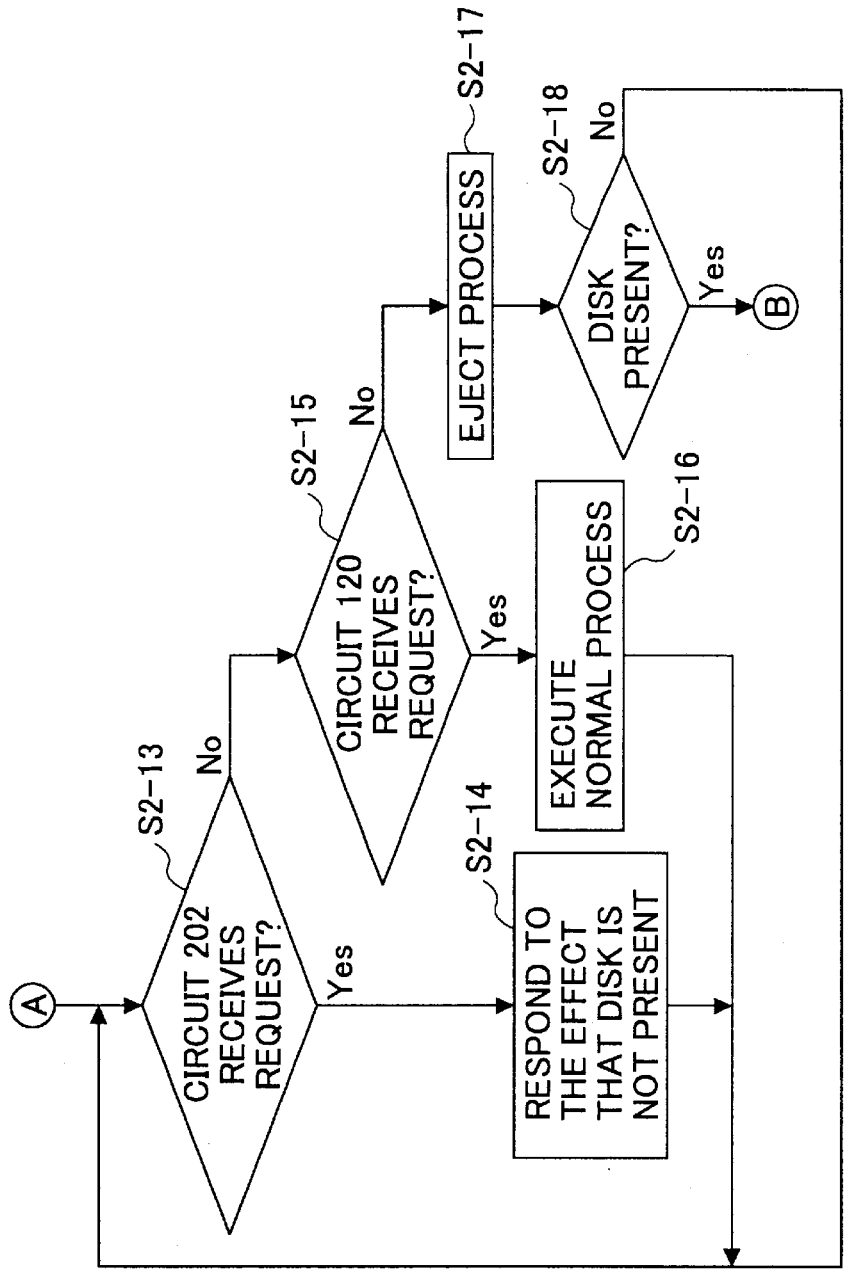

FIG. 15 and FIG. 16 are process flowcharts of the third variation according to the present embodiment. Elements in FIG. 15 and FIG. 16 that are identical to the elements shown in FIG. 9 and FIG. 10 are referenced by the same reference marks, and will not be described in detail.

In place of the judgment of whether the switch 127 is on or off made in step S2-2 shown in FIG. 9, the output of the voltage detection circuit 401 is used in making the following judgment. That is, when the output of the voltage detection circuit 401 is high-level in step S2-21, step S2-4 is performed because it can be judged that a computer is connected to the USB connector 126. On the other hand, when the output of the voltage detection circuit 401 is low-level in step S2-21, step S2-3 is performed because it can be judged that no computer is connected to the USB connector 126.

According to the present variation, inserting a USB cable from a computer into the USB connector 126 enables an automatic switching of the connection to the computer.

Besides, although an IDE interface is used for connecting the computer body 11 and the CD-R/RW drive in the above-described embodiment, other interfaces, such as a USB interface, may also be used. Also, although an USB interface is used for connecting an external computer and the CD-R/RW drive in the above-described embodiment, the interface is not limited thereto, and other interfaces, such as IEEE1394, may also be used. Thus, interfaces used for connecting the computer body 11 and the CD-R/RW drive, and for connecting an external computer and the CD-R/RW drive are not limited to the IDE interface and the USB interface.

Additionally, although one interface is provided between one external computer and the CD-R/RW drive in the above-described embodiment, a plurality of interfaces may be provided.

Additionally, although the above-described embodiment is described by taking a CD-R/RW drive as an example of a peripheral device, the present invention is not limited thereto, and is applicable to peripheral devices in general, including a storage drive, such as a floppy disk drive, a CD-ROM drive, a DVD-ROM drive, a DVD-RAM drive, and a tape drive, which are connected to and controlled by a computer.

The present invention is not limited to the specifically disclosed embodiments, and variations and modifications may be made without departing from the scope of the present invention.

The present application is based on Japanese priority application No. 2001-249095 filed on Aug. 20, 2001, the entire contents of which are hereby incorporated by reference.

What is claimed is:

1. A peripheral device incorporated in a body of a first computer, comprising:
    a first interface unit connecting the peripheral device to the first computer and enabling data exchange between the peripheral device and the first computer;
    a second interface unit connecting the peripheral device to a second computer separate from the first computer and enabling data exchange between the peripheral device and the second computer;
    a selection unit selecting one of the first interface unit and the second interface unit; and
    a control unit being responsive to a state of the selection unit upon starting of the first computer and causing the selected one of the first interface unit and the second interface unit to enable the data exchange between the peripheral device and a corresponding one of the first computer and the second computer through the state of the selection unit.

2. The peripheral device as claimed in claim 1, wherein said peripheral device is supplied with a driving power in said first computer.

3. The peripheral device as claimed in claim 1, wherein said selection unit is composed of a switch.

4. The peripheral device as claimed in claim 1, wherein said selection unit selects a predetermined one of said interface units based upon a state of said selection unit.

5. The peripheral device as claimed in claim 1, wherein a said peripheral device, has a front panel and wherein
    at least one of interface units is exposed at a front panel of said body.

6. A peripheral device incorporated in a body of a first computer, comprising:
    a first interface unit connecting the peripheral device to the first computer and enabling data exchange between the peripheral device and the first computer;

a second interface unit connecting the peripheral device to a second computer separate from the first computer and enabling data exchange between the peripheral device and the second computer;

a selection unit selecting one of the first interface unit and the second interface unit; and a control unit being responsive to a state of the selection unit upon exchanging of a medium in the peripheral device and causing the selected one of the first interface unit and the second interface unit to enable the data exchange between the peripheral device and a corresponding one of the first computer and the second computer through the state of the selection unit.

7. The peripheral device as claimed in claim 6, wherein said peripheral device is supplied with a driving power in said first computer.

8. The peripheral device as claimed in claim 6, wherein said selection unit is composed of a switch.

9. The peripheral device as claimed in claim 6, wherein said selection unit selects a predetermined one of said interface units based upon a state of said selection unit.

10. The peripheral device as claimed in claim 6, wherein a said peripheral device, has a front panel and wherein at least one of interface units is exposed at a front panel of said body.

11. A peripheral device incorporated in a body of a first computer, comprising:

a first interface unit connecting the peripheral device to the first computer and enabling data exchange between the peripheral device and the first computer;

a second interface unit connecting the peripheral device to a second computer separate from the first computer and enabling data exchange between the peripheral device and the second computer;

a selection unit selecting one of the first interface unit and the second interface unit; and a control unit being responsive to a state of the selection unit and causing the selected one of the first interface unit and the second interface unit to enable the data exchange between the peripheral device and a corresponding one of the first computer and the second computer through the state of the selection unit, and the control unit receiving a request from the non-selected interface unit and notifying the non-selected interface unit that no medium is recognized.

12. The peripheral device as claimed in claim 11, wherein said peripheral device is supplied with a driving power in said first computer.

13. The peripheral device as claimed in claim 11, wherein said selection unit is composed of a switch.

14. The peripheral device as claimed in claim 11, wherein said selection unit selects a predetermined one of said interface units one based upon a state of said selection unit.

15. The peripheral device as claimed in claim 11, wherein a said peripheral device, has a front panel and wherein at least one of interface units is exposed at a front panel of said body.

* * * * *